(12) United States Patent
Yang

(10) Patent No.: US 7,187,812 B2
(45) Date of Patent: Mar. 6, 2007

(54) OPTICAL FINGERPRINT SENSOR WITH VARIABLE RESISTORS

(75) Inventor: Chien-Sheng Yang, Taipei (TW)

(73) Assignee: AU Optronics Corp., Hsin-Chu (TW)

( * ) Notice: Subject to any disclaimer, the term of this patent is extended or adjusted under 35 U.S.C. 154(b) by 692 days.

(21) Appl. No.: 10/605,005

(22) Filed: Aug. 31, 2003

(65) Prior Publication Data

US 2005/0013469 A1     Jan. 20, 2005

(30) Foreign Application Priority Data

Jul. 17, 2003     (TW)    ................ 92119572 A

(51) Int. Cl.
 *G06K 7/00*     (2006.01)
 *G06K 9/00*     (2006.01)
(52) U.S. Cl. ....................... 382/312; 382/124
(58) Field of Classification Search ........ 382/124–127, 382/312; 356/71
See application file for complete search history.

(56) References Cited

U.S. PATENT DOCUMENTS 5,325,442 A * 6/1994 Knapp ........................ 382/124
5,778,089 A * 7/1998 Borza ......................... 382/124
5,991,467 A   11/1999 Kamiko
6,011,860 A * 1/2000 Fujieda et al. ............. 382/126

FOREIGN PATENT DOCUMENTS

TW          377426       12/1999

OTHER PUBLICATIONS

Jai Il Ryu et al., "A Novel Amorphous Silicon Photoconductor Array", Journal of the Korean Physical Society, Dec. 2001. pp. s264-s267, vol. 39.

* cited by examiner

*Primary Examiner*—Duy M. Dang
(74) *Attorney, Agent, or Firm*—Winston Hsu

(57) ABSTRACT

A fingerprint sensor for sensing a fingerprint has a detecting and processing circuit and a plurality of sensing units. Each of the sensing units has a switch element, a first resistor, and a second resistor. The switch element has a first terminal, a second terminal, and a third terminal. Resistance of the second resistor is fixed. The fingerprint influences an intensity of light illuminating the first resistor so that resistance of the first resistor and a voltage level of the second terminal change. When the switch elements are turned on, the detecting and processing circuit analyzes the fingerprint according to the voltage levels of the second terminals of the plurality switch elements.

5 Claims, 5 Drawing Sheets

OPTICAL FINGERPRINT SENSOR WITH VARIABLE RESISTORS

BACKGROUND OF INVENTION

1. Field of the Invention

The invention relates to a fingerprint sensor, and more particularly, to an optical fingerprint sensor with variable resistors.

2. Description of the Prior Art

Please refer to FIG. 1, FIG. 1 shows a functional diagram of conventional fingerprint sensor 10. The fingerprint sensor 10 is a capacitive fingerprint sensor that senses fingerprints by detecting changes of capacitances. The fingerprint sensor 10 comprises a detecting and processing circuit 12 and a sensing area 14. When a user fingers the sensing area 14, the related circuits of sensing area 14 produce corresponding signals in accordance with the fingerprint and transfer the signals to the detecting and processing circuit 12 to analyze and identify.

FIG. 2 is a circuit diagram of the sensing area 14 in FIG. 1. The sensing area 14 comprises a plurality of sensing units 16 arranged in matrix. Each of the sensing units 16 is used for sensing the texture of a fingerprint on the corresponding position and comprises a transistor 18 and a detecting capacitor Cf. When the sensing area 14 acts, the source S of the transistor 18 is given a detecting signal Vs1 or Vs2. When the user fingers the surface of the sensing area 14, the capacitance of the detecting capacitor Cf is changed. As the capacitance of the detecting capacitor Cf is changed, the gate voltage of the transistor 18 is also changed with capacitive coupling effect. The variation$_{13}$Δ Vg of the gate voltage of the transistor 18 is decided by the capacitance of the detecting capacitor Cf and is showed as:

$$\Delta Vg = Vs \cdot Cgs/(Cgs+Cf)$$

where Vs is the voltage value of the detecting signal Vs1 or Vs2;

Cgs is the parasitical capacitance between gate G and source S of the transistor 18; and Cf is the capacitance of the detecting capacitor.

The variation_Δ Vg of the gate voltage of the transistor 18 directly influences the electric current I which flows through the transistor 18. The detecting and processing circuit 12 identifies the fingerprint in accordance with the variation of electric current I. However, detecting the variation of electric current I to identify the user's fingerprint is usually interfered with by the leakage current of the adjacent transistor 18 and limits the accuracy.

SUMMARY OF INVENTION

It is therefore a primary objective of the claimed invention to provide an optical fingerprint sensor that identifies a fingerprint by detecting the variation of voltage to solve the above-mentioned problem.

According to the claimed invention, a fingerprint sensor includes a detecting and processing circuit and_a plurality of sensing units. Each of the sensing units has a switch element, a first resistor, and a second resistor. The switch element includes a first terminal, a second terminal, and a third terminal. The first terminal is connected to a switch terminal, the third terminal is connected to the detecting and processing circuit, and the switch element is turned on/off by the switch terminal. The first resistor has a first terminal connected to the second terminal of the switch element, and a fingerprint influences_an intensity of light illuminating the first resistor so that resistance of the first resistor and a voltage level of the second terminal of the switch element are changed. The second resistor has a first terminal connected to the second terminal of the switch element and the resistance of the second resistor is fixed. When the switch elements are turned on, the detecting and processing circuit analyzes the fingerprint according to the voltage levels of the second terminals of the plurality switch elements.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
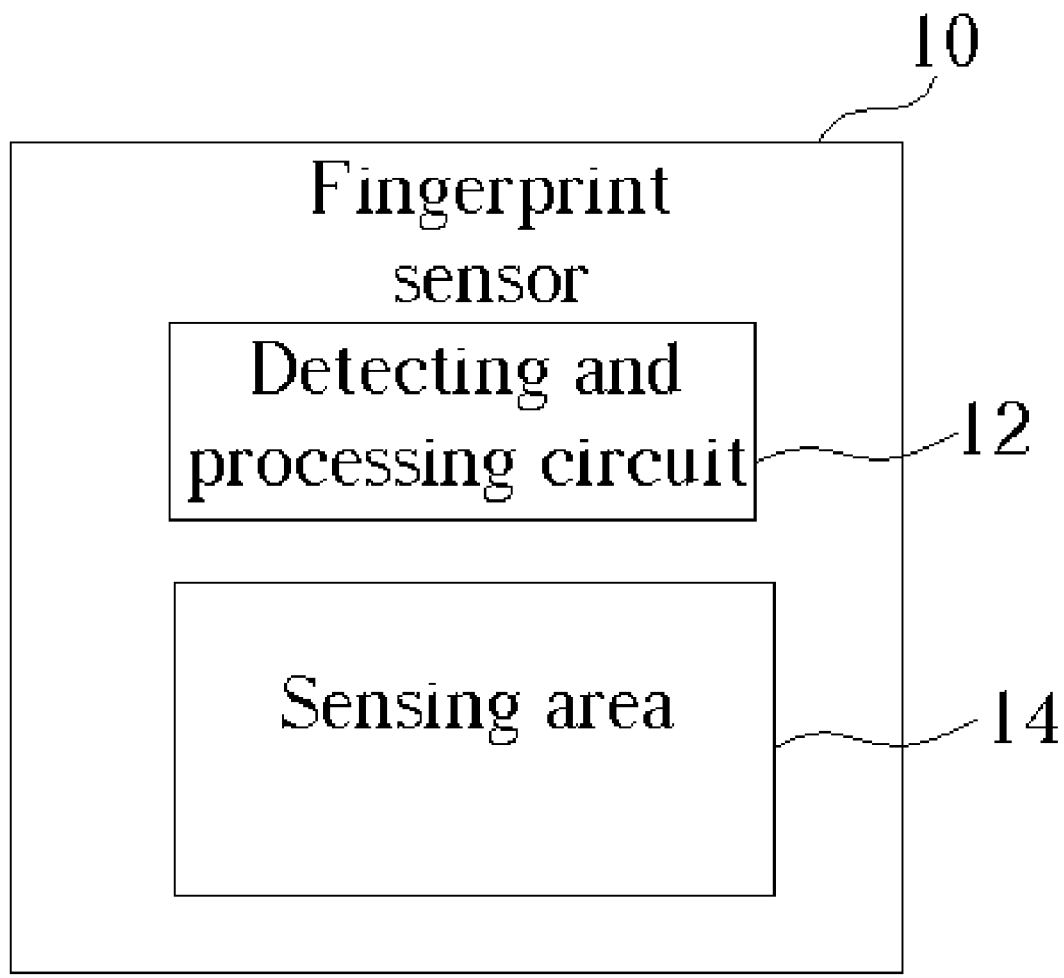
FIG. 1 is a functional diagram of the capacitive fingerprint sensor according to prior art.
Figure 2:
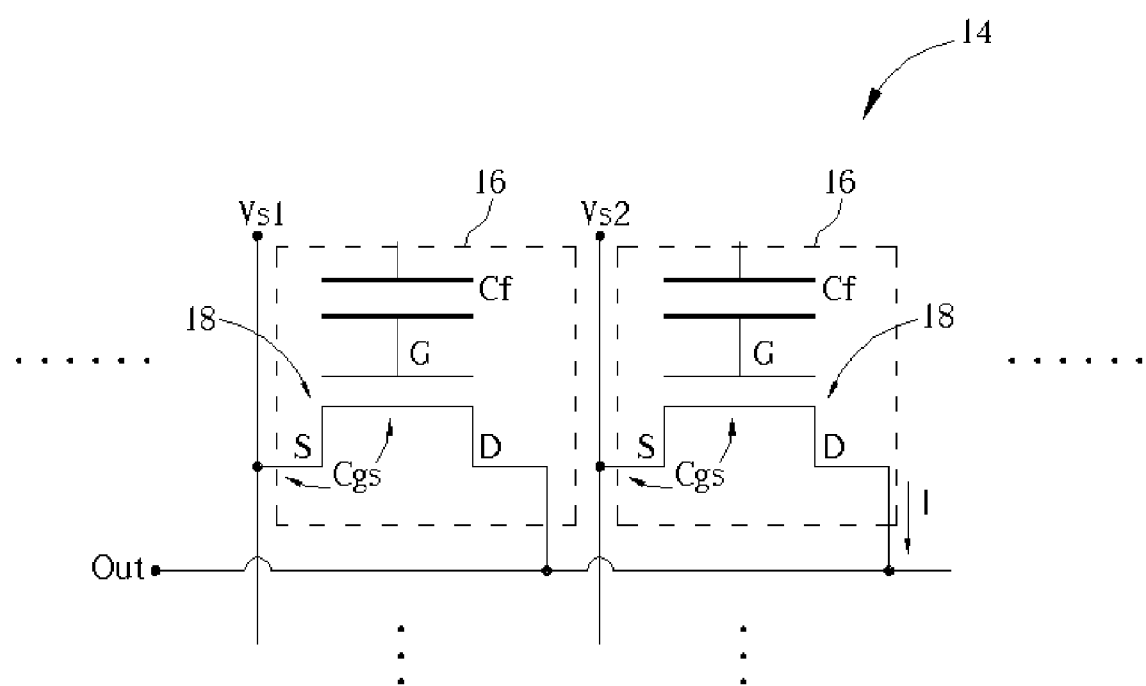
FIG. 2 is a circuit diagram of a sensing area of the fingerprint sensor shown in FIG. 1.
Figure 3:
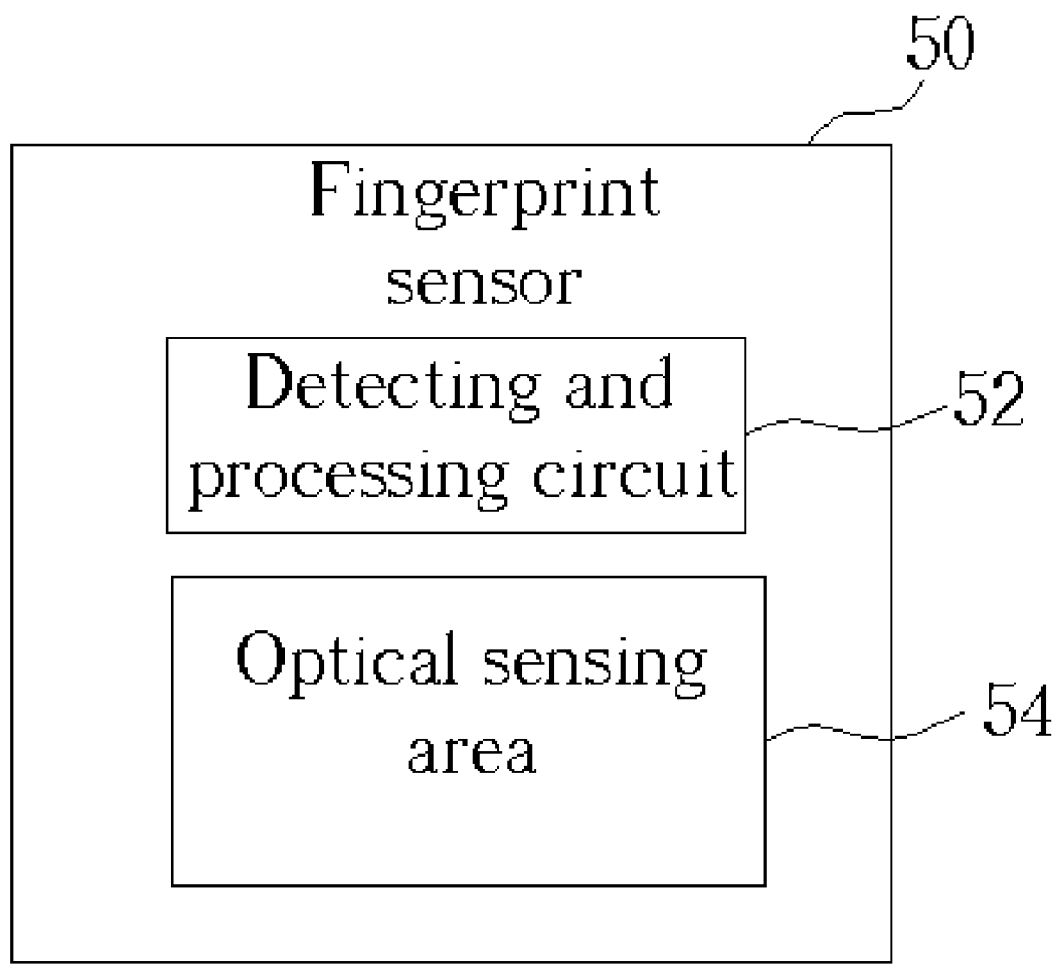
FIG. 3 is a functional diagram of the resistive fingerprint sensor according to present invention.

FIG. 3 is a functional diagram of a fingerprint sensor 50 according to present invention. The fingerprint sensor 50 is a resistive fingerprint sensor that senses fingerprint by detecting the variation of voltage. The fingerprint sensor 50 comprises a detecting and processing circuit 52 and andan-optical sensing area 54. The optical sensing area 54 comprises a plurality of sensing units; each of the sensing units comprises a variable resistor whose resistance is changed with the intensity of light.

Figure 4:
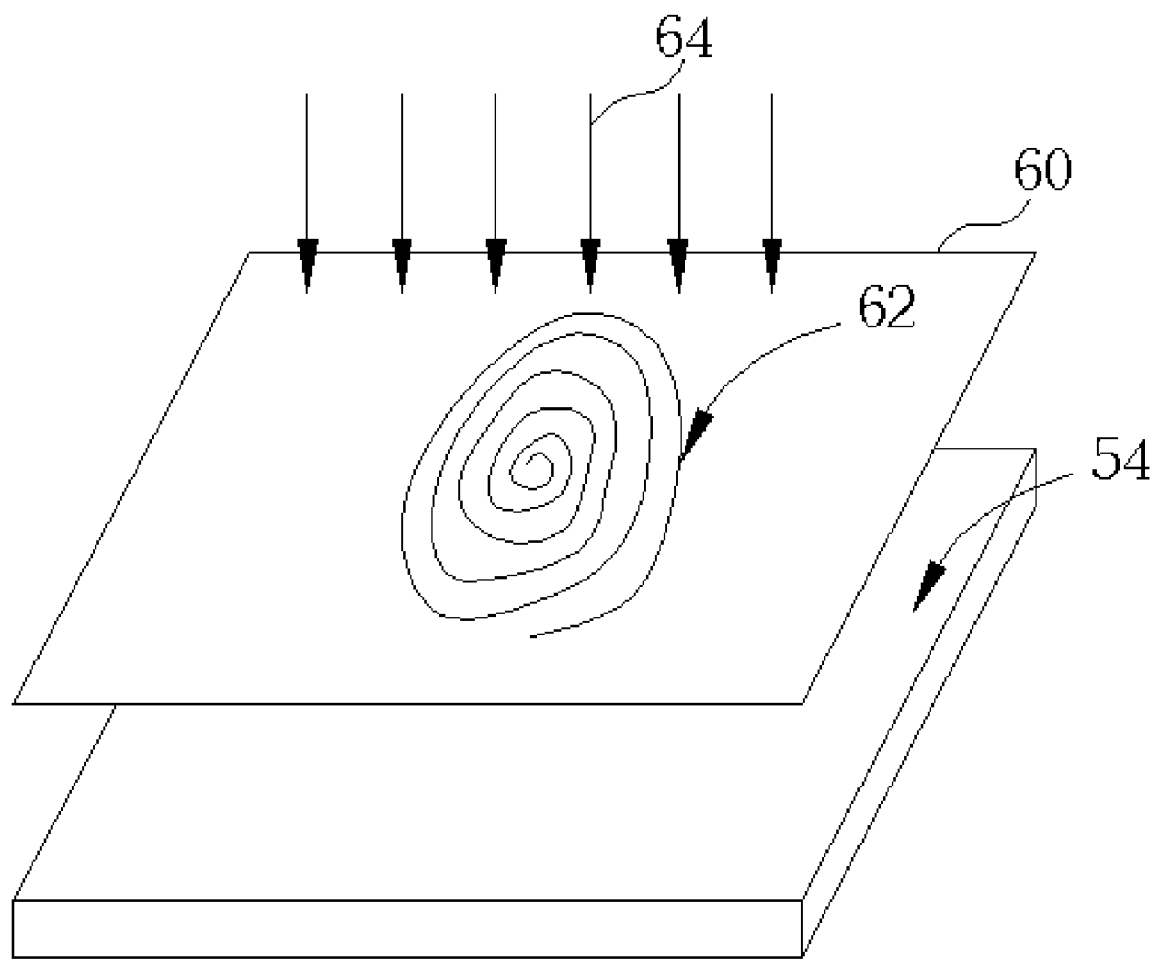
FIG. 4 is a diagram representing sensing a fingerprint with the fingerprint sensor shown in FIG. 3.

Please refer to FIG. 4. FIG. 4 is a diagram representing sensing a fingerprint 62 with the fingerprint sensor 50 shown in FIG. 3. When sensing the fingerprint 62, the fingerprint 62 is first formed on a transparent material 60. The transparent material 60 is then illuminated with the light 64 to influence an intensity of light illuminating on the optical sensing area 54. The variable resistors of the sensing units in the optical sensing area 54 have resistances corresponding to different intensity of light. After being illuminated by the light 64, the plurality of sensing units output voltage signals to the detecting and processing circuit 52. The voltage signals correspond to the resistances of the variable resistors. By receiving the voltage signals, the detecting and processing circuit 52 can identify the fingerprint 62 on the transparent material 60.

Figure 5:
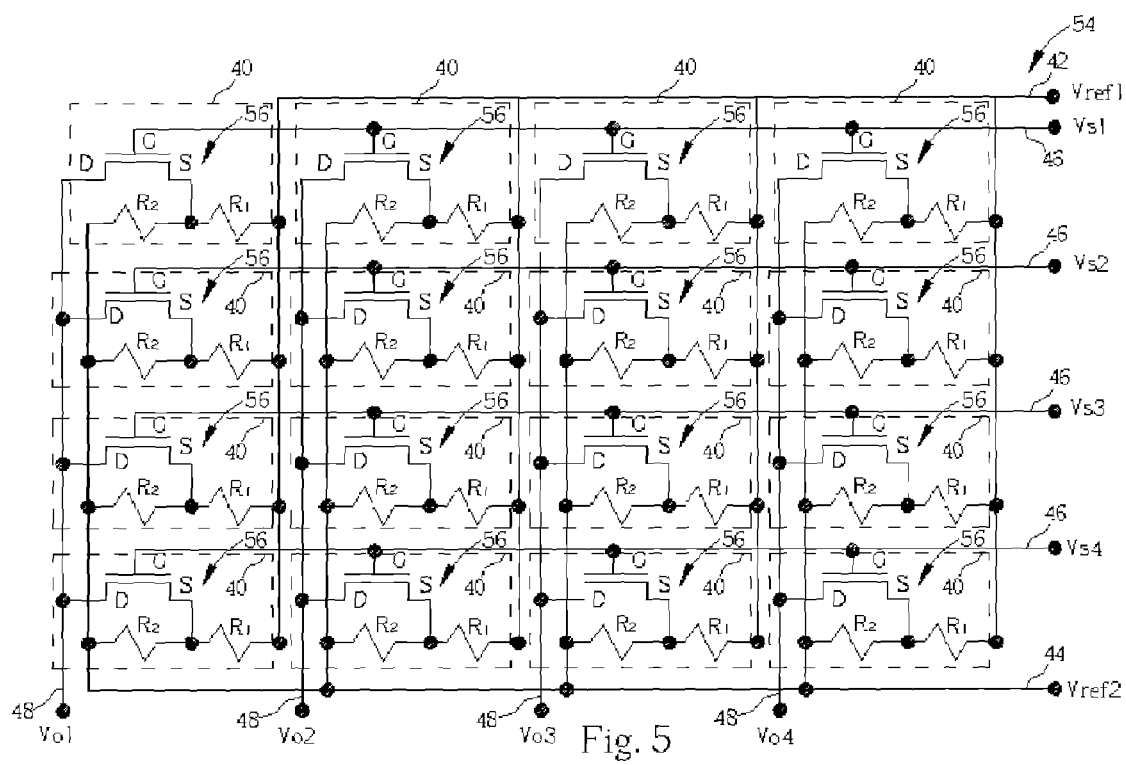
FIG. 5 is a circuit diagram of an optical sensing area shown in FIG. 3.

Please refer to FIG. 5. FIG. 5 is a circuit diagram of the optical sensing area 54 shown in FIG. 3. The optical sensing area 54 comprises a plurality of sensing units 40, each of the sensing units 40 is electrically connected to a first reference terminal 42 and a second reference terminal 44, and each of the sensing units 40 comprises a first resistor R1, a second resistor R2, and a transistor 56 acting as a switch element. The first resistor R1 and the second resistor R2 are electrically connected to the first reference terminal 42 and the second reference terminal 44 in series. A second terminal of the first resistor R1 is electrically connected to the first reference terminal 42 and a second terminal of the second resistor R2 is electrically connected to the second reference terminal 44. The first resistor R1 is an optical variable resistor whose resistance changes with the intensity of light. The first resistor R1 is manufactured from amorphous silicon. When the intensity of light illuminating on the first resistor R1 becomes stronger, the resistance becomes lower, and when the intensity of light illuminating on the first resistor R1 becomes weaker, the resistance becomes higher. The resistance of the second resistor R2 is fixed and is not influenced by intensity of light. The second resistor R2 is manufactured from indium tin oxide (ITO).

In this embodiment, the transistor 56 is a metal-oxide semiconductor (MOS) transistor comprising a first terminal G as a gate, a second terminal S as a source, and a third terminal D as a drain. The gate G of the transistor 56 is connected to a switch terminal 46, and the transistor 56 is turned on/off by the switch terminal 46. Normally the switch terminal 46 is floatingly connected and the transistor 56 is turned off. When a switch voltage Vs1, Vs2, Vs3 or Vs4 is given to the switch terminal 46, a channel is formed in the transistor 56 and conducts the source S and the drain D. Additionally, the source S of the transistor 56 is connected to the first resistor R1 and the second resistor R2, and the drain D is connected to a corresponding output terminal 48.

When the transparent material 60 is placed on the optical sensing area 54 to sense the fingerprint 62, a first predetermined reference voltage Vref1 is connected to the first reference terminal 42, and a second predetermined reference voltage Vref2 is connected to the second reference terminal 44. The voltage level of the first predetermined reference voltage Vref1 is different from the voltage level of the second predetermined reference voltage Vref2. So, the voltage Vs of the source S of the transistor 56 is shown as:

$$Vs = Vref1 - \left[\frac{r1}{r1+r2}(Vref1 - Vref2)\right] = Vref2 - \left[\frac{r2}{r1+r2}(Vref2 - Vref1)\right]$$

where r1 is resistance of the first resistor R1 and r2 is resistance of the second resistor R2.

Since the fingerprint 62 shields portions of the light 64 illumination, the resistance of the first resistor R1 of the sensing unit 40 is variable. The resistance of the first resistor R1 that is shielded by the fingerprint 62 is higher than the resistance of the first resistor R1 that is unshielded. The fingerprint 62 influences the intensity of light illuminating each of the first resistors R1, so the resistance r1 of each of the first resistors R1 is variable according to the fingerprint 62. Besides, as the above-mentioned formula shows, the first predetermined reference voltage Vref1, the second predetermined reference voltage Vref2, and the resistances r1, r2 decide the voltage Vs of source S of transistor 56. The resistance r2 is fixed and the voltages Vref1 and Vref2 are predetermined, so the voltage Vs decides the intensity of light illuminating on the first resistor R1. The voltages Vs of transistors 56 show an arrangement of texture of the fingerprint 62. The detecting and processing circuit 52 can identify the fingerprint 62 in accordance with the voltages Vs of the plurality of transistors 56.

When the fingerprint 62 changes the voltages Vs of a plurality of transistors 56, the detecting and processing circuit 52 gives a switch voltage Vs1, Vs2, Vs3, or Vs4 to the gates G of transistors 56 through the switch terminals 46 to turn on the corresponding transistors 56. After turning on the transistors 56, the voltages of sources S change the voltages of the drains D of transistors 56. The voltages of the drains D of turned-on transistors 56 also show an arrangement of texture of the fingerprint 62. Additionally, the detecting and processing circuit 52 detects the voltage of the drain D with the output terminal 48 and analyzes the arrangement of texture of the fingerprint 62 in accordance with the voltages of the drains D to identify the fingerprint 62. For avoiding interference of the voltages of the drains D, the switch voltages are only given to the transistors 56 in same row at the same time.

Compared to the conventional capacitive fingerprint sensor, the resistive fingerprint sensor comprises a detecting and processing circuit and a plurality of sensing units. Each of the sensing units comprises a switch element, a variable_resistor, and a fixed_resistor. The resistance of the_variable_resistor is influenced by_an intensity of light illuminating the variable resistor_and changes the output voltage of the switch element. The detecting and processing circuit senses an arrangement of texture of the fingerprint by detecting the output voltage. Additionally, the resistive fingerprint sensor of present invention senses the fingerprint by detecting the output voltage so the problem of being influenced by leakage current is overcome. The sensitivity and accuracy of the resistive fingerprint sensor is greater than that of capacitive fingerprint sensor.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A fingerprint sensor for sensing a fingerprint, the fingerprint sensor comprising:
    a detecting and processing circuit; and
    a plurality of sensing units, each of the sensing units comprising:
        a switch element comprising a first terminal, a second terminal, and a third terminal, the first terminal is connected to a switch terminal, the third terminal is connected to the detecting and processing circuit, and the switch element is turned on/off by the switch terminal;
        a first resistor having a first terminal connected to the second terminal of the switch element, a fingerprint influenced_intensity of light illuminating the first resistor so that resistance of the first resistor and a voltage level of the second terminal of the switch element change; and
        a second resistor having a first terminal connected to the second terminal of the switch element and the resistance of the second resistor is fixed;
    wherein when the switch elements are turned on, the detecting and processing circuit analyzes the fingerprint according to the voltage levels of the second terminals of the plurality switch elements.

2. The fingerprint sensor of claim 1 wherein each of the sensing units has a second terminal of the first resistor connected to a first predetermined reference voltage and has a second terminal of the second resistor connected to a second predetermined reference voltage, the voltage level of the first reference voltage differing from the voltage level of the second reference voltage.

3. The fingerprint sensor of claim 1 wherein each of the switch elements is a transistor.

4. The fingerprint sensor of claim 1 wherein the first resistor is manufactured from amorphous silicon.

5. The fingerprint sensor of claim 1 wherein the second resistor is manufactured from indium tin oxides.

\* \* \* \* \*